R. M. NICOLAYSEN.
MACHINE FOR GRINDING CUTTERS, REAMERS, AND LIKE TOOLS.
APPLICATION FILED MAR. 27, 1919.

1,336,533.

Patented Apr. 13, 1920.

Inventor
Ragnvald M. Nicolaysen

By Clement R. Stickney
Attorney

UNITED STATES PATENT OFFICE.

RAGNVALD M. NICOLAYSEN, OF DETROIT, MICHIGAN.

MACHINE FOR GRINDING CUTTERS, REAMERS, AND LIKE TOOLS.

1,336,533.   Specification of Letters Patent.   Patented Apr. 13, 1920.

Application filed March 27, 1919. Serial No. 285,468.

*To all whom it may concern:*

Be it known that I, RAGNVALD M. NICOLAYSEN, a resident of the United States, residing at Detroit, Wayne county, Michigan, have invented certain new and useful Improvements in Machines for Grinding Cutters, Reamers, and like Tools, of which the following is a specification.

This invention relates to a machine whereby drills, cutters, reamers and like tools are ground accurately by means that support the tool rigidly, automatically advance it tooth by tooth, facet by facet, flute by flute or rib by rib, and at the will of the operator may likewise cause the grinding stone to advance into the work as the latter is turned.

The invention consists in the matters hereinafter set forth, and more particularly pointed out in the appended claims.

Figure 1:
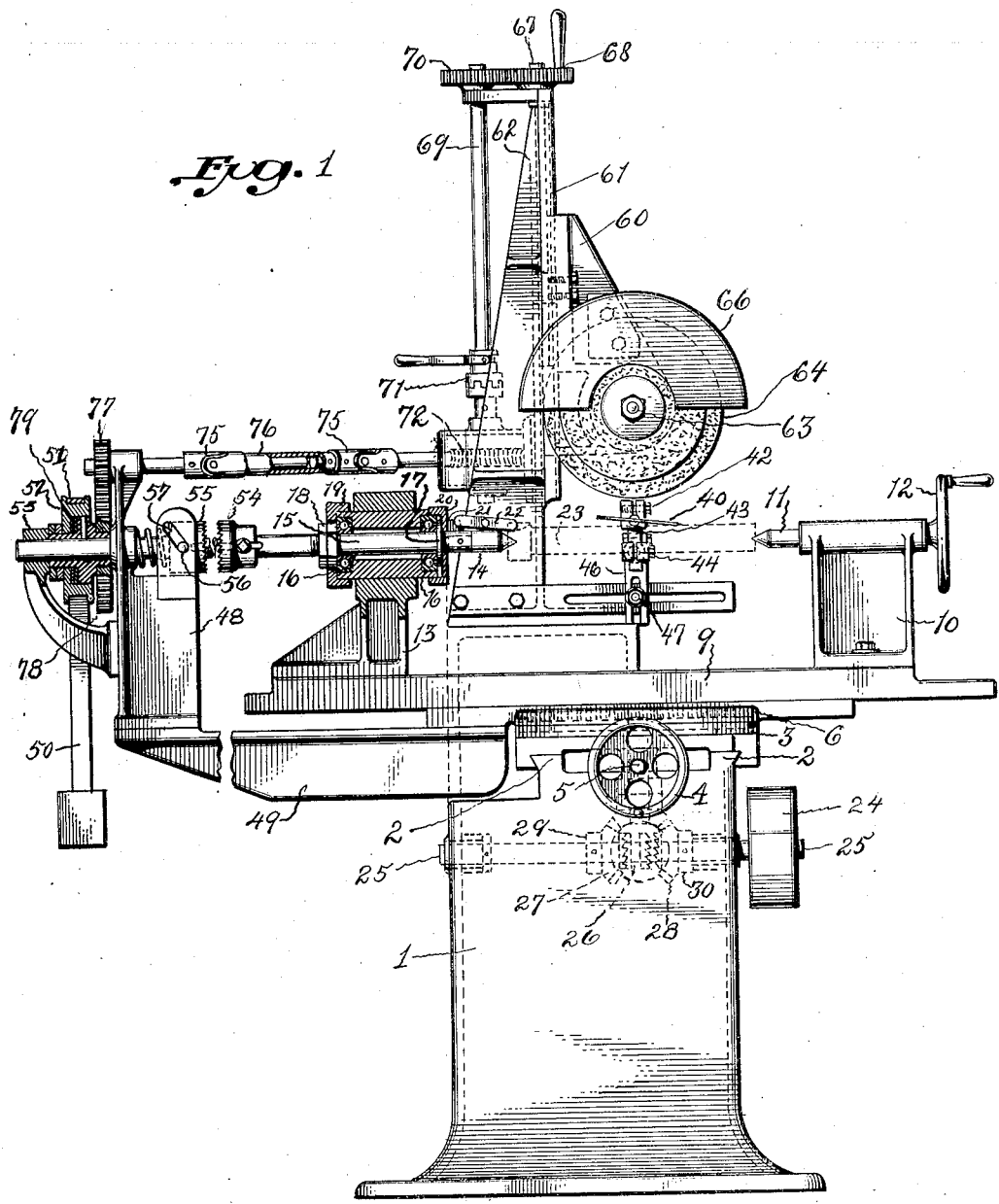
Figure 1 is a view in front elevation, partially broken away and in section, of a machine that embodies features of the invention.
Figure 2:
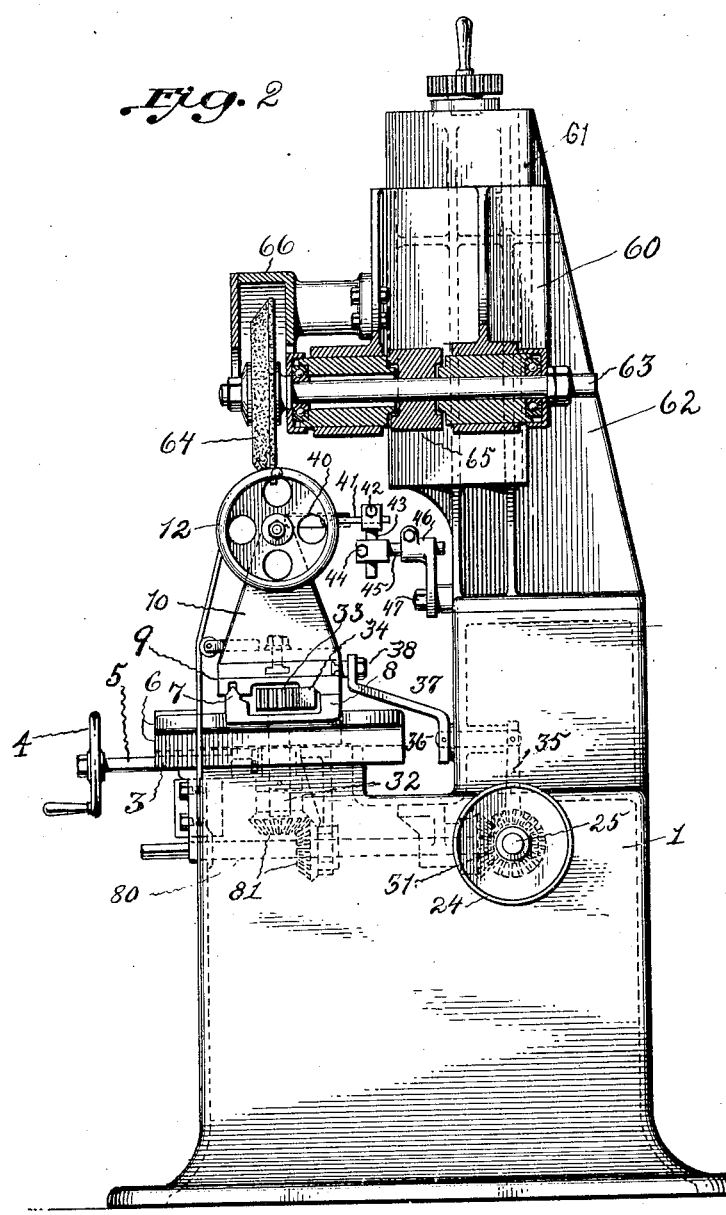
Fig. 2 is a view in side elevation thereof partially broken away and in section.
Figure 3:
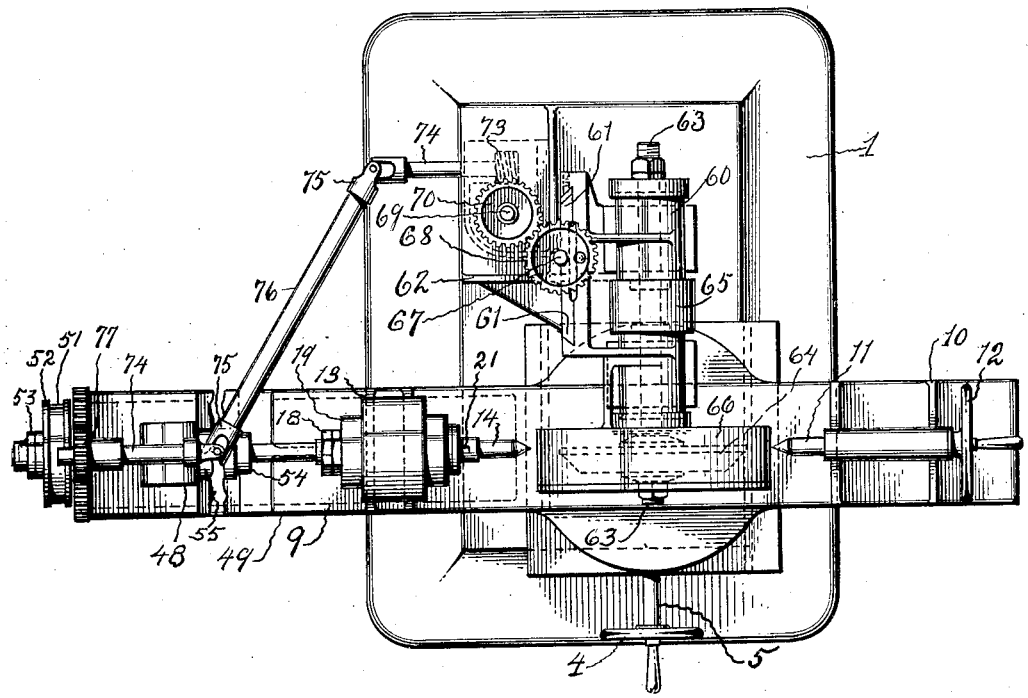
Fig. 3 is a plan view of the machine, partially broken away.

Referring to the drawings a base 1 of suitable design to give desired strength and rigidity, has a pair of ways 2 on which a swivel head 3 may be moved to and from the front of the machine by a hand wheel 4 and screw spindle 5 rotatable in the base, engaging the head. A bed plate 6 is swiveled on the member 3 so as to be clamped in any desired angular position by suitable means, not indicated here. Guideways 7 and 8 are formed on this head 6 on which the base of a reversing table 9 is reciprocatable. A stationary tail rest 10 on one end of the table carries a center 11 that is longitudinally adjustable in the manner of a lathe tail center by means of a hand wheel 12. A center head 13 on the other end of the table 9 carries a center 14 in axial alinement with the center 11, that is mounted in a spindle 15 journaled in suitable bearing 10 in the head 13, there being a suitable thrust collar 17, jam nuts 18 and retaining bushings 19 to hold the parts in position. A driving head 20, turning with the center, has a lug 21 and dog 22 to rotate work indicated at 23 when the latter is hung between the centers 11 and 14. Obviously the construction of the bearing head 13 and journaled arrangement for carrying the center 14 and driving the work may be varied as desired within the limits of good shop practice.

The reversing table 9 is reciprocated by any suitable means, as for example, a drive pulley 24 that operates a shaft 25 journaled in the base and operably connected by a slide clutch collar 26, which is adapted according to its position to lock the shaft to either one of a pair of opposed bevel gears 27 and 28 rotatable thereon between stop collars 29 and 30. The bevel gears are in mesh at opposite points with a follower pinion 31 which through a countershaft 80, and meshing gears 81 rotates an upright spindle 32 in axial coincidence with the swivel head 3 and body plate 6, the axis of the spindle 32 intersecting the common axis of the centers 11 and 14. A gear 33 non-rotatably secured on the spindle 32 engages a rack bar 34 on the reversing table 9. The clutch collar 26 is thrown alternately into engagement through its ratchet teeth into corresponding ratchet teeth on the gears 27 and 28 by means of a shifting yoke 35 which embraces the circumferentially slotted body of the collar 26 and is oscillatory on a pivot shaft 36 which is knocked one way or the other by a finger 37 encountering a pair of stops 38 adjustably secured on the bed 9 so as to determine the range of travel of the bed.

The work 23 is arranged between the centers with a flute or rib thereof bearing against a stop or locating plate 40 of spring material, carried by a shank 41 adjustably clamped as by a screw 42 in the head of a transversely disposed member 43; the latter is angularly adjustable by means of a clamping screw 44 in a transversely disposed member 45 which in turn is angularly adjustable in a steady rest 46 adjustably secured by a bolt 47 or the like to the frame. Toward its limit of motion in the direction of the end carrying the rotatable center, the reversing table 9 approaches an upright bracket 48 carried on an extension 49 of the bed plate 6. A weighted lever arm 50 that is angularly adjustable as by means of a friction strap 51 embracing a friction wheel 52 on the spindle 15 that extends through the arm 48 and outboard bearing 53, normally holds the work 23 against the spring index plate 40 until such time as a ratchet toothed collar 54 on the spindle encounters a similarly toothed cam collar 55 journaled in the bracket 48. A cam pin 56 on the collar 55 engages an oblique slot 57 in the member 48 and causes the forward rotation of the spindle 15 when the cam is encountered by the collar 55, against the action of the weighted arm 50, the spring of the index 40 permitting the latter to snap into the next groove of the work. Retrograde movement of the table allows a spring 59 or like means to return the collar 55 to initial disengaged position.

A grinding head 60 is reciprocatable at right angles to the axis of the centers 11 and 14 on suitable ways 61 of an upright post 62 of appropriate design on the bed 1 of the machine. A wheel shaft 63 is suitably journaled in the head and carries a grinding wheel 64 thereon in proper relation to the axis of the centers 11 and 14. A pulley 65 affords means for application of power to the shaft and wheel and a guard plate 66 covers the latter. A screw-threaded spindle 67 rotatable in the post 62 parallel to the ways 61, passes through a suitable nut or the like, not indicated in detail, in the head 60 and allows the latter to be raised and lowered by a hand gear wheel 68.

If desired, the head may be fed downwardly automatically by means of a countershaft 69 connected by a gear 70 to the hand wheel gear 68. A hand-operated clutch 71 of any preferred type may lock the countershaft 69 with a worm wheel 72. A worm 73 that drives the worm wheel is connected by end shafts 74, universal joints 75 and telescoping sections of a Cardan drive shaft 76, with a pinion 77. The latter is back geared to a gear 78 on the spindle 15 that is frictionally held by plates 79 to turn with the wheel 52 or drum on which the counter weight 50 acts. When the clutch 71 is in, each throw of the spindle 15 through the cam collar 55, pin 56 and cam slot 57, turns the screw threaded spindle 67 and thereby feeds the wheel 64 toward the work. Friction connection between the gear 78 and the spindle 15 is precautionary to prevent positive movement in case of accident. It is to be understood that the usual provisions for lubrication, exclusion of dust, takeup of wear, and hand adjustment to set the machine for any particular piece of work, are provided. In operating, after adjustment of the work and of the machine to the work, the movement of the work table past the wheel carries one facet, flute, rib or cutting edge properly past the wheel, the counter weight holding the work so that the index plate guides the work on the adjacent flute or like part and thus insures proper configuration of the dressed face. At the conclusion of the forward stroke the cam collar advances the work one tooth, the weight taking up slack against the index finger and the grinding wheel traversing the newly presented face as before. After one revolution of the work, or at any time desired, the automatic feed for moving the grinding wheel toward the axis of the work may be thrown into action at the will of the operator.

Obviously changes in the details of construction may be made without departing from the spirit of the invention and I do not care to limit myself to any particular form or arrangement of parts.

I claim—

1. In a tool grinding machine, grinding means rotatable in a fixed plane, work supporting means reciprocatable past the grinding means angularly adjustable in respect to the plane of the grinding means, means for locating and guiding the work as it contacts with and traverses the grinding means and means for driving the grinding means and work supporting means.

2. In a tool grinding machine, grinding means rotatable in a fixed plane, means for supporting and reciprocating work past the grinding means adapted to automatically determine the path of contact of the grinding means with the work and arranged to be adjusted to travel at any angle within the limit of the machine in relation to the fixed plane of the grinding means, means for automatically reciprocating the work supporting means and means for driving the grinding means.

3. In a tool grinding machine, grinding means rotatable in a fixed plane, means angularly adjustable in relation to the plane of the grinding means for supporting and reciprocating work past and in contact with the grinding means, means intermittently operating the work supporting means to advance the work on its axis past the grinding means, means for reciprocating the work supporting means, adjustable to vary the range of movement of the supporting means and means for automatically advancing the grinding means toward the work.

4. In a tool grinding machine, grinding means rotatable in a fixed plane, means angularly adjustable in relation to the plane of the grinding means for supporting and reciprocating work past and in contact with the grinding means, mean intermittently operating the work supporting means to advance the work on its axis past the grinding means, means for reciprocating the work supporting means and means for automatically advancing the grinding means toward the work transversely to the work supporting means.

5. In a tool grinding machine, a rotatable grinding member turning in a fixed plane, angularly adjustable work supporting means reciprocable past the grinding member, work locating and guiding means coöperating with the work to guide the work as desired across the grinding means, means for automatically reciprocating the work supporting means, adjustable to vary the range of motion of the supporting means and means for rotating the grinding member.

6. In a tool grinding machine, a rotatable grinding member turning in a fixed plane, angularly adjustable work supporting means reciprocable past the grinding member, work locating and grinding means coöperating with the work supporting means to guide the work as desired across the grinding means, means for automatically reciprocating the work supporting means adjustable to vary the range of motion of the supporting means, and means controlled and operated by the work supporting means for automatically advancing the grinding member toward the work intermittently.

7. In a tool grinding machine, longitudinally reciprocatable work supporting means angularly adjustable in an axis transverse to the plane of reciprocation including a rotatable work supporting member and means for turning the member intermittently at each reciprocation of the supporting means.

8. In a tool grinding machine, a base, work supporting means swiveled on the base and adapted to reciprocate thereon, means in the base for reciprocating the work supporting means in any position assumed by it, means on the base defining the travel of work supported on the device and means on the base for grinding such work.

9. In a tool grinding machine, a base, a platen swiveled on the base, a driving spindle on the base, concentric with the platen, a table reciprocating on the platen, a rack on the table, a gear on the spindle engaging the rack, a main driving shaft, means on the shaft for driving the spindle in either direction, a clutch on the shaft for throwing either means into engagement with the shaft, means on the base defining the path of travel of work on the table and means on the base for grinding the work supported on the table.

10. In a tool grinding machine, a base, work supporting means, means securing the work supporting means in angularly adjustable position on the base, means for reciprocating the work supporting means in any adjusted angular position, means for intermittently turning work secured on the supporting means, means on the base coöperating with the work turning means for guiding work in a predetermined path of travel, grinding means on the base in operative relation to the work supporting means, means for rotating the grinding means, and means controlled and operated by the work supporting means adapted to automatically advance the grinding means intermittently toward the work.

11. In a tool grinding machine, grinding means turning in a fixed plane, work supporting means reciprocatable past the grinding means and angularly adjustable in respect to the plane of the grinding means, and means for turning the work through a predetermined angle at each reciprocation.

12. In a tool grinding machine, grinding means turning in a fixed plane, means for reciprocating work past the grinding means in desired angular relation thereto, means for turning the work on the supporting axis thereof through a predetermined angle at each reciprocation, and means for advancing the grinding means toward the work at each reciprocation a predetermined distance.

13. In a tool grinding machine, a base, a grinding head shiftable thereon, a grinding member rotatable on the head, a work supporting table angularly adjustable in relation to the grinding head and reciprocatable on the base, adjustable means on the base and table for reciprocating the latter over a desired range, a work locating member on the base, a work supporting member journaled on the table and adapted yieldingly to coöperate with the locating means to define the path of motion of work on the table, and means operated by a movement of the table and connected to the grinding head to intermittently advance the latter toward the work.

14. A tool grinding machine comprising a base, work supporting means angularly adjustable and reciprocatable at any angle within range thereof on the base, means for grinding the work rotatably supported on the base to turn in a fixed plane, means engaging the work for registering and maintaining the same in operative relation to the grinding means and means for driving the grinding means and for reciprocating the work supporting means.

15. A tool grinding machine comprising a base, a rotatable and longitudinally reciprocatable work supporting means angularly adjustable on the base, adapted to be automatically and intermittently turned toward the limit of each reciprocation, means on the base for grinding the work rotatable in a fixed plane and adjustably supported in operative relation to the work supporting means, means for registering and maintaining the work in operative relation to the grinding means, and means on the base for reciprocating the work supporting means and driving the grinding means.

RAGNVALD M. NICOLAYSEN.